(12) United States Patent
O'Brien

(10) Patent No.: US 9,517,720 B2
(45) Date of Patent: Dec. 13, 2016

(54) VISIBLE SCHOOL STOP SIGN APPARATUS

(71) Applicant: Mark Kevin O'Brien, New York, NY (US)

(72) Inventor: Mark Kevin O'Brien, New York, NY (US)

(*) Notice: Subject to any disclaimer, the term of this patent is extended or adjusted under 35 U.S.C. 154(b) by 142 days.

(21) Appl. No.: 14/505,212

(22) Filed: Oct. 2, 2014

(65) Prior Publication Data
US 2016/0096469 A1    Apr. 7, 2016

(51) Int. Cl.
B60Q 1/50    (2006.01)
B60Q 1/26    (2006.01)

(52) U.S. Cl.
CPC ............... B60Q 1/50 (2013.01); B60Q 1/2692 (2013.01)

(58) Field of Classification Search
CPC .......... B60Q 1/50; B60Q 9/00; B60Q 1/2676; B60R 21/34; G09F 7/00; G09F 7/22; G09F 21/04
USPC .............. 116/28 R, 30, 35 A, 45, 46, 51, 52, 53,116/63 R; 40/466, 475, 588, 589, 590, 591, 592, 40/612; 340/433
See application file for complete search history.

(56) References Cited

U.S. PATENT DOCUMENTS

| | | | |
|---|---|---|---|
| 1,455,526 A * | 5/1923 | Flowers | B60Q 1/44 116/45 |
| 1,685,080 A * | 9/1928 | Auchincloss | B60R 13/105 40/588 |
| 3,394,674 A * | 7/1968 | Downing | G08G 1/096716 116/63 R |
| 4,094,083 A * | 6/1978 | Fund | B60R 13/10 40/533 |
| 4,106,229 A * | 8/1978 | Schmid | G09F 7/00 40/588 |
| 4,559,518 A * | 12/1985 | Latta, Jr. | B60Q 1/50 116/28 R |
| 4,715,138 A * | 12/1987 | Cherico | G09F 21/04 40/588 |
| 5,355,117 A | 10/1994 | Jefferson | |
| 6,034,609 A * | 3/2000 | Comiskey, Jr. | G09F 11/025 340/631 |
| 6,515,583 B1 | 2/2003 | Lamparter | |
| 6,688,028 B2 * | 2/2004 | Backe | G09F 15/0087 40/466 |
| 6,956,502 B1 * | 10/2005 | Bartinelli | G08G 1/095 340/907 |
| 7,005,973 B2 * | 2/2006 | Haigh | G09F 21/04 116/28 R |
| 7,474,201 B2 * | 1/2009 | Swanger | B60Q 1/50 116/28 R |
| 8,698,610 B2 | 4/2014 | Krugh | |

(Continued)

Primary Examiner — R. A. Smith
(74) Attorney, Agent, or Firm — Dunlap Bennett & Ludwig PLLC

(57) ABSTRACT

A school bus sign with increased visibility is provided. The school bus stop sign apparatus includes at least a first stop sign and a second stop sign. The first stop sign may be pivotally attached to the side of a school bus. The second stop sign is attached to and substantially parallel with the side of the school bus. The second stop sign includes an indicator that allows drivers to sense that the bus is stopped to pick up children. When activated, the first stop sign may pivot 90 degrees and may be substantially perpendicular to the side of the bus. The indicator, such as a light, may be activated on the second stop sign. Therefore, a driver may see that the bus is picking up children from the front, the rear and the side.

11 Claims, 4 Drawing Sheets

(56) References Cited

U.S. PATENT DOCUMENTS

2014/0165437 A1\* 6/2014 Barker ..................... G09F 7/00
  40/607.01

\* cited by examiner

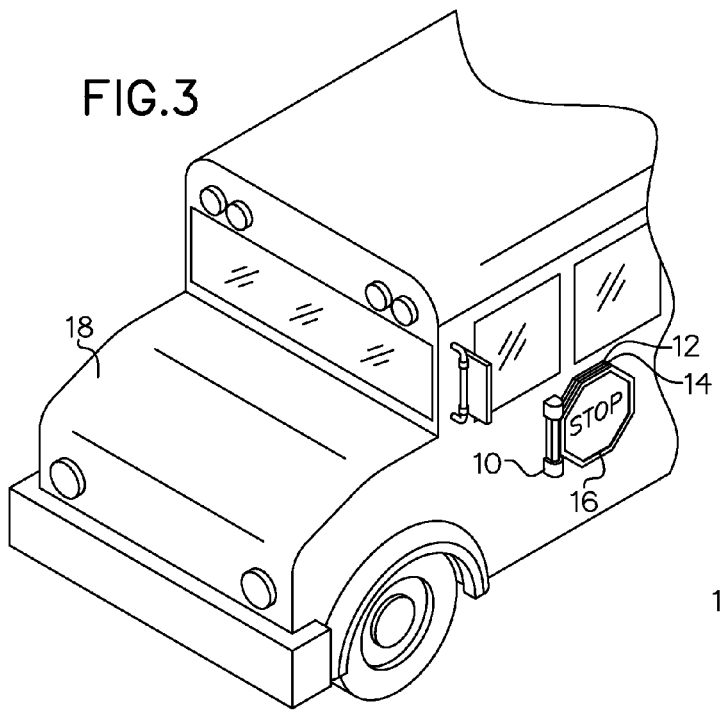
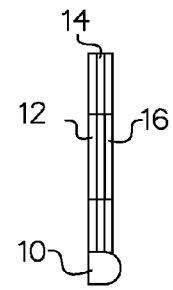
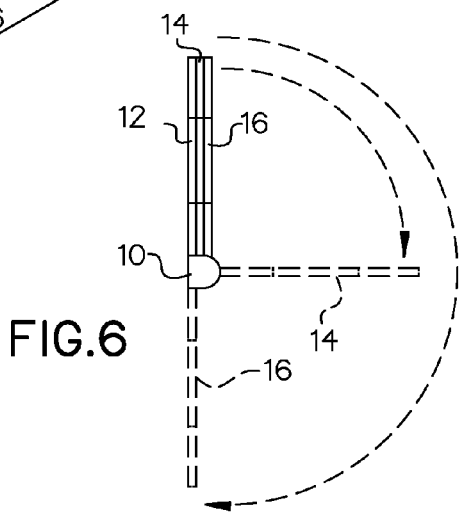
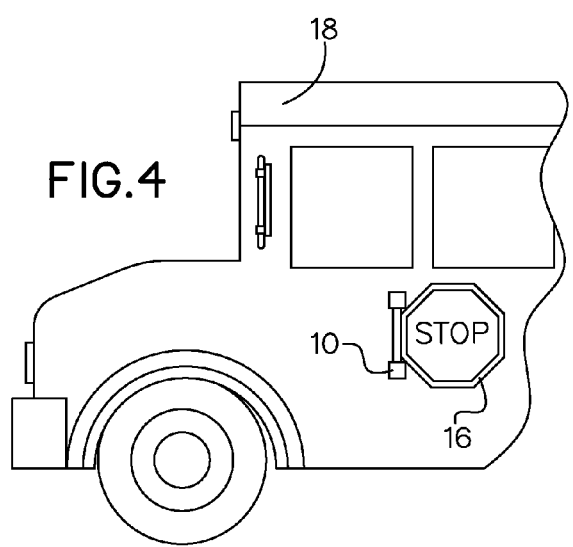
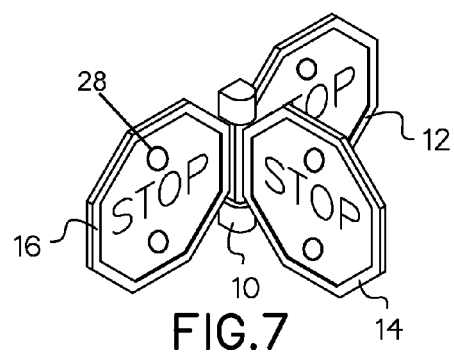

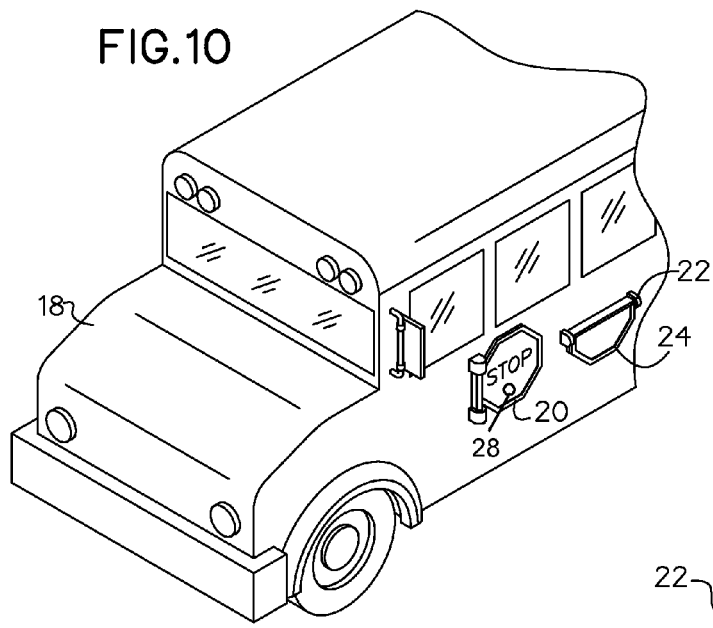
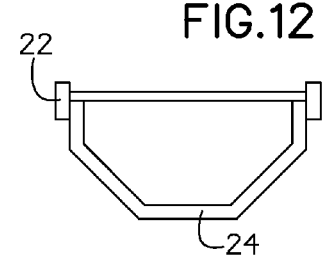
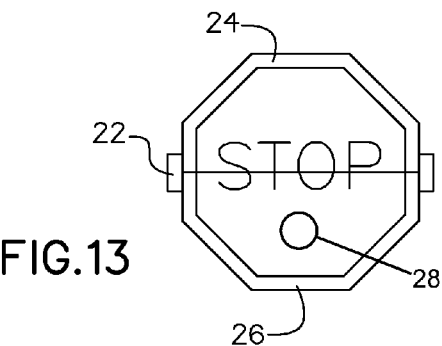
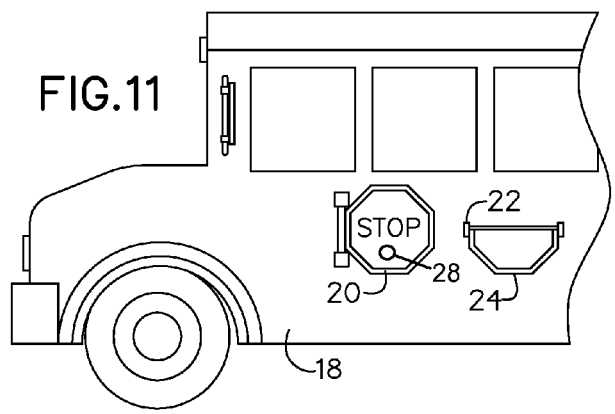
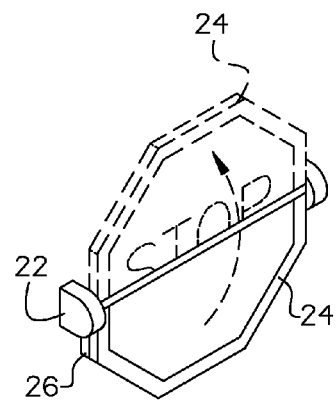

VISIBLE SCHOOL STOP SIGN APPARATUS

BACKGROUND OF THE INVENTION

The present invention relates to a school bus sign and, more particularly, to a visible school stop sign apparatus.

School bus stop signs are currently pivotally attached to the sides of school buses. When the school bus stops to pick up children, the stop sign is activated to pivot so that the school bus stop sign is perpendicular relative to the side of the school bus. A school bus stop sign when activated becomes visible to vehicles approaching the school bus either from the front or from the rear. The stop sign is not however visible to vehicles approaching the bus from the side, such as vehicles exiting driveways, parking lots and side roads.

As can be seen, there is a need for an improved visible school stop sign apparatus.

SUMMARY OF THE INVENTION

In one aspect of the present invention, a school bus stop sign apparatus comprises: a first stop sign pivotally attached to a side of a school bus; a first actuator operatively connected to the first stop sign operable to pivot the at least first stop sign to an expanded form, wherein the stop sign is substantially perpendicular to the side of the school bus, and a retracted form, wherein the stop sign is substantially parallel with the side of the bus; a second stop sign attached to and substantially parallel with the side of the school bus, wherein the second stop sign comprises an indicator; and an activation component operatively connected to the actuator and the indicator and comprising an activation and a deactivation, wherein the activation comprises the first stop sign actuated to the expanded form and further comprises the activation of the indicator, and the deactivation comprises the first stop sign actuated to the retracted form and further comprises the deactivation of the indicator.

These and other features, aspects and advantages of the present invention will become better understood with reference to the following drawings, description and claims.

BRIEF DESCRIPTION OF THE DRAWINGS

FIG. 3 is a perspective view of the present invention shown in a retracted form;

FIG. 4 is a side view shown of the present invention in a retracted form;

FIG. 5 is a top view of the present invention shown in a retracted form;

FIG. 6 is a top view of the present invention shown in a retracted form and in the expanded form in phantom;

FIG. 7 is a perspective view of the present invention shown in an expanded form;

FIG. 10 is a perspective view of the present invention shown in a retracted form;

FIG. 11 is a side view of the present invention shown in a retracted form;

FIG. 12 is a front view of the present invention shown in a retracted form;

FIG. 13 is a front view of the present invention shown in an expanded form; and

FIG. 14 is a perspective view of the present invention shown in a retracted form and in the expanded form in phantom.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

The present invention includes a device to make school bus stop signs more visible. The present invention allows for the school bus stop sign to be visible from almost every angle relative to the bus. Therefore, cars in the vicinity of a stopped school bus will be able to clearly see the stop sign and safely stop.

Figure 1:
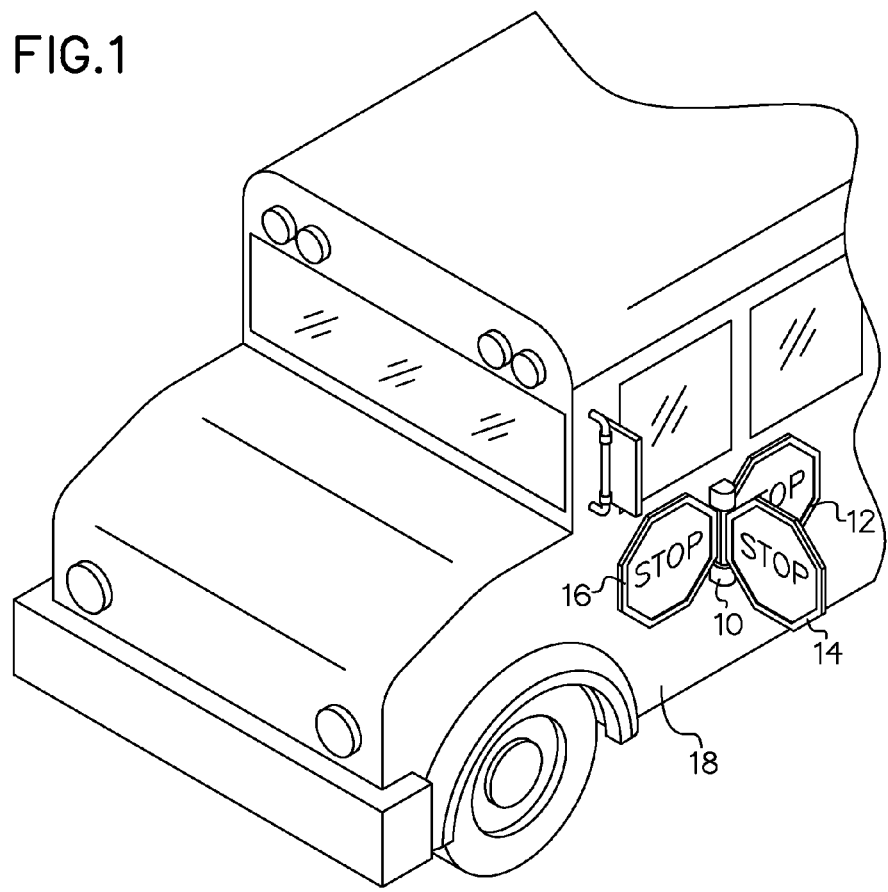
FIG. 1 is a perspective view of the present invention shown in an expanded form.
Figure 2:
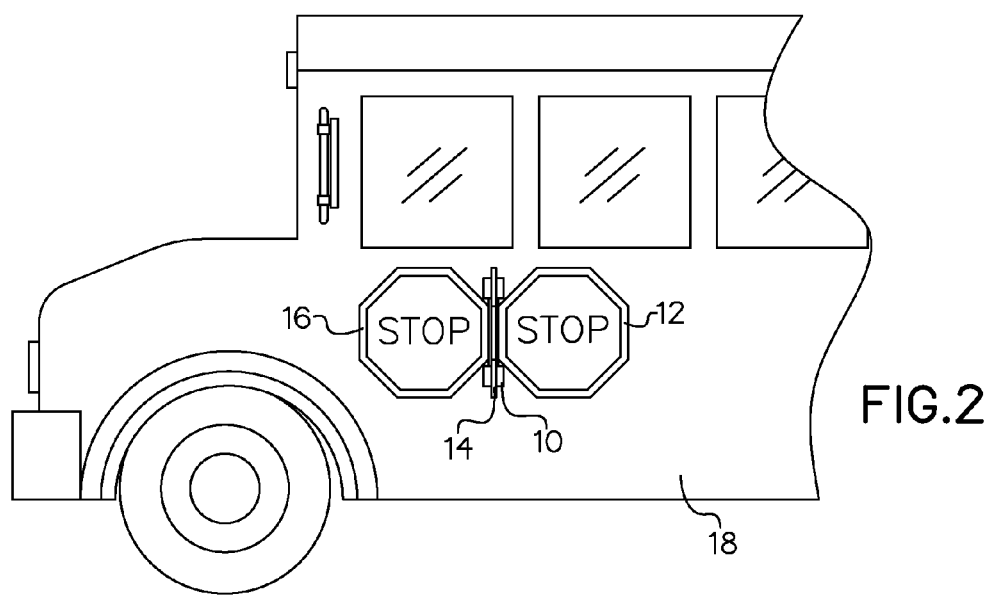
FIG. 2 is a side view of the present invention shown in an expanded form.
Figure 8:
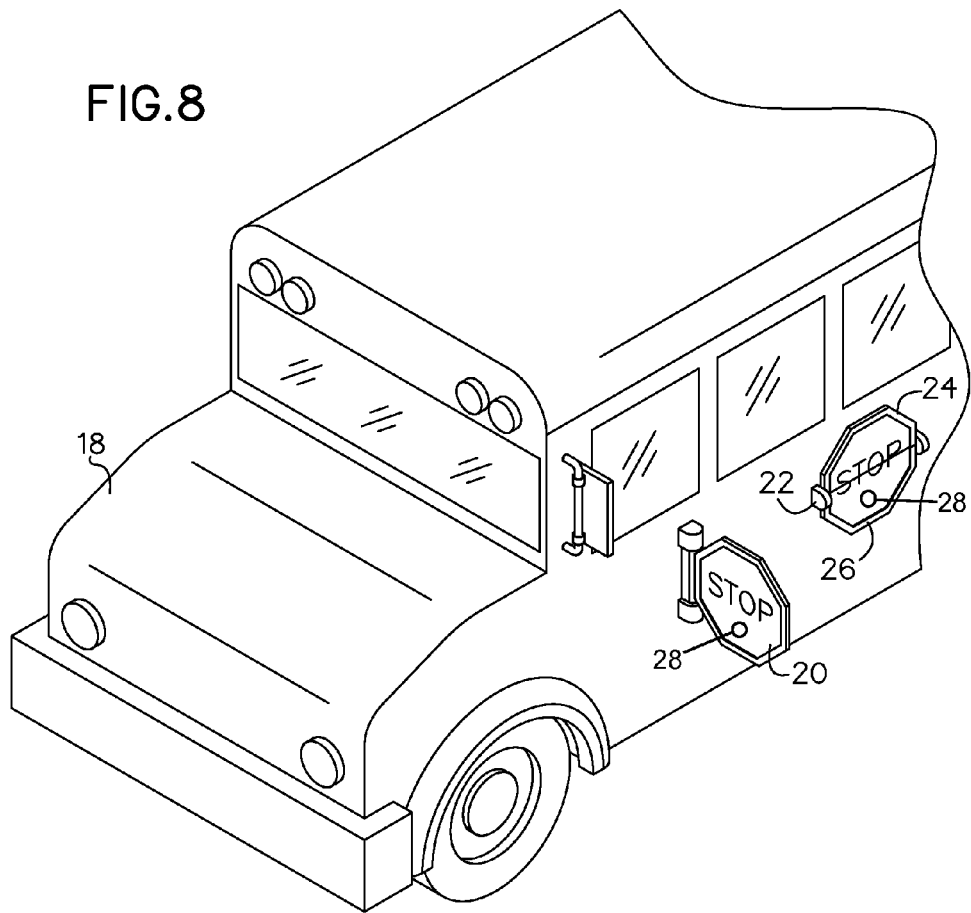
FIG. 8 is a perspective view of the present invention of an alternate embodiment shown in an expanded form.
Figure 9:
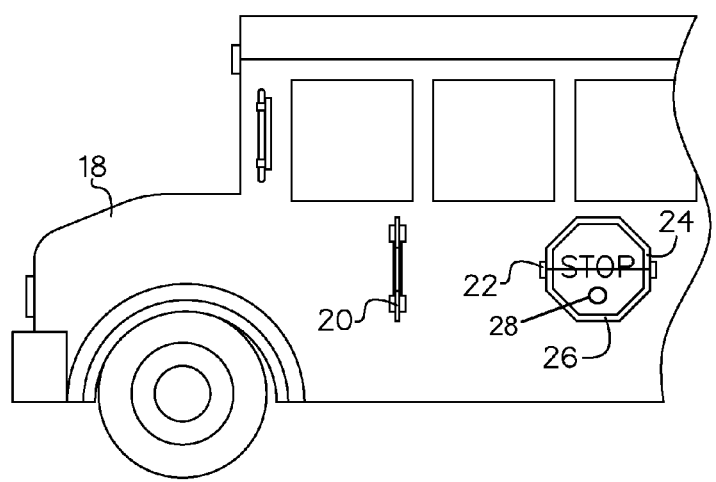
FIG. 9 is a side view of the present invention shown in an expanded form.

Referring to FIGS. 1 through 14, the present invention includes a school bus stop sign apparatus. The school bus stop sign apparatus includes at least a first stop sign 14 and a second stop sign 16. The first stop sign 14 may be pivotally attached to a side of a school bus 18. A first actuator 10 may be operatively connected to the first stop sign 14. The actuator 10 is operable to pivot the first stop sign 14 from a retracted form to an expanded form and back to the retracted form. The expanded form includes the first stop sign 14 substantially perpendicular to the side of the school bus 18, and the retracted form includes the first stop sign 14 substantially parallel with the side of the bus 18. The second stop sign 16 is attached to and substantially parallel with the side of the school bus. The second stop sign 16 includes an indicator that allows drivers to sense that the bus 18 is stopped to pick up children.

The present invention may further include an activation component operatively connected to the actuator 10 and the indicator. The activation component may be activated and deactivated. The activation of the activation component may include the first stop sign 10 actuated to the expanded form. The activation may also activate the indicator. The deactivation may include the first stop sign 14 actuated to the retracted form and may further include the deactivation of the indicator. The activation component allows the bus driver to stop and turn on the system so that drivers around the bus know to stop. Further, the bus driver may deactivate the system when the bus driver is finished picking up children.

In certain embodiments, the second stop sign 16 may be pivotally attached to the side of the bus 18. The first actuator 10 may be operatively connected to the second stop sign 16. The actuator 10 is operable to pivot the second stop sign 16 from a retracted form to the expanded form and back to the retracted form. The expanded form of the second stop sign 16 may include the second stop sign pivoting 180 degrees from its original position. The retracted form of the second stop sign 16 may include the second stop sign 16 pivoting back to the original position. The expanded form of the second stop sign 16 may be the indicator, and may thereby indicate that the drivers should stop.

The present invention may further include a third stop sign 12. The third stop sign 12 may be attached to the side of the school bus 18. In certain embodiments, the third stop sign 12 may be fixedly secured to the school bus 18, as opposed to being pivotally attached. The third stop sign 12 may only be revealed in the expanded form. In certain embodiments, the perimeter of the first stop sign 14, the second stop sign 16, and the third stop sign 12 are aligned when the first stop sign 14, the second stop sign 16, and the third stop sign 12 are in the retracted form. Further, each of the stop signs 12, 14, 16 may include an indicator, such as a flashing light 28. In such embodiments, the stop signs 12, 14, 16 may be activated so that the second stop sign 16 pivots 180 degrees, the first stop sign 14 pivots 90 degrees and the third stop sign 12 is revealed. The flashing lights 28 may also be activated.

In certain embodiments, the second stop sign 16 may include a first half 24 and a second half 26 pivotally attached to one another. A second actuator 22 may be operatively connected to the second stop sign 16 and operable to pivot one of the first half 24 and the second half 26 relative to one another. In such embodiments, the second stop sign 16 includes an expanded form and a retracted form. The expanded form includes the first half 24 pivoted away from the second half 26 and displaying the stop sign. The retracted form includes the first half 24 pivoted towards the second half 26, and thereby hiding the stop sign. The expanded form of the second stop sign 16 may be the indicator. In such embodiments, the bus driver may activate the first sign 14 and the second sign 16 when the bus 18 is stopped to pick up children. The first sign 14 may pivot 90 degrees, and the second half 26 of the second sign 16 may pivot 90 degrees displaying the stop sign. Further, the signs 14, 16 may include flashing lights 28 that may be activated. When the school bus driver is ready to driver away, the signs 14, 16 may pivot back to their retracted positions.

It should be understood, of course, that the foregoing relates to exemplary embodiments of the invention and that modifications may be made without departing from the spirit and scope of the invention as set forth in the following claims.

What is claimed is:

1. A school bus stop sign apparatus comprising:
a first stop sign pivotally attached to a side of a school bus near a front end of the school bus;
a first actuator operable to pivot the first stop sign to an expanded form comprising the stop sign substantially perpendicular to the side of the school bus, and a retracted form comprising the stop sign substantially parallel with the side of the bus;
a second stop sign attached to and substantially parallel with the side of the school bus, wherein the second stop sign is adjacent to the first stop sign, wherein the second stop sign comprises an indicator; and
an activation component operatively connected to the actuator and the indicator and comprising an activation and a deactivation, wherein the activation comprises the first stop sign actuated to the expanded form and activation of the indicator, wherein the second stop sign remains substantially parallel with the side of the school bus, and the deactivation comprises the first stop sign actuated to the retracted form and deactivation of the indicator.

2. The school bus stop sign apparatus of claim 1, wherein the second stop sign is pivotally attached to the side of the school bus, wherein the first actuator is operable to pivot the second stop sign to the expanded form comprising the second stop sign pivoting 180 degrees, and the retracted form comprising the second stop sign pivoting back 180 degrees, wherein the expanded form of the second stop sign is the indicator.

3. The school bus stop sign apparatus of claim 2, wherein the retracted form comprises the perimeter of the first and second stop signs aligning.

4. The school bus stop sign apparatus of claim 3, further comprising a third stop sign attached to the side of the school bus, wherein the retracted form comprises the perimeter of the first, second, and third stop signs aligning.

5. The school bus stop sign apparatus of claim 4, wherein each of the first, the second and the third stop signs each comprise the indicator.

6. The school bus stop sign apparatus of claim 5, wherein the indicator further comprises at least one light attached to each of the first, second, and third stop signs.

7. The school bus stop sign apparatus of claim 1, wherein the indicator comprises at least one light.

8. The school bus stop sign apparatus of claim 1, wherein the second stop sign comprises a first half and a second half pivotally attached to one another, and a second actuator operatively connected to the second stop sign and operable to pivot at least one of the first half and the second half relative to one another.

9. The school bus stop sign apparatus of claim 8, wherein the second stop sign comprises an expanded form and a retracted form, wherein the expanded form comprises the first half pivoted away from the second half, and the retracted form comprises the first half pivoted towards the second half.

10. The school bus stop sign apparatus of claim 9, wherein the expanded form of the second stop sign is the indicator.

11. A school bus stop sign apparatus comprising:
a first stop sign pivotally attached to a side of a school bus;
a second stop sign attached to and substantially parallel with the side of the school bus; and
at least one actuator operable to pivot the first stop sign and the second stop sign to an expanded form and a retracted form, wherein the expanded form comprises the first stop sign substantially perpendicular to the side of the school bus and the second stop sign pivoted 180 degrees, and the retracted form comprises the first stop sign substantially parallel with the side of the bus and the second stop sign pivoted back 180 degrees; and
an activation component operatively connected to the actuator and the indicator and comprising an activation and a deactivation, wherein the activation comprises the first and second stop sign actuated to the expanded form, and the deactivation comprises the first and second stop sign actuated to the retracted form.

\* \* \* \* \*